June 13, 1967  HIROSHI ONO  3,325,231

MINIATURE MOTOR BEARING

Filed Oct. 10, 1963

INVENTOR:
HIROSHI ONO
BY
Watson D. Harbaugh
ATT'Y

United States Patent Office 3,325,231
Patented June 13, 1967

3,325,231
MINIATURE MOTOR BEARING
Hiroshi Ono, Chicago, Ill., assignor to Webcor, Inc., Chicago, Ill., a corporation of Illinois
Filed Oct. 10, 1963, Ser. No. 315,227
7 Claims. (Cl. 308—36.3)

This invention relates to motor bearing constructions and their lubrication generally, and more particularly to an improved sleeve type bearing for miniature prime movers wherein oil is retained in the bearing by capillary action under both working and resting conditions and provisions are made for axial circulation caused by the rotation of a smooth shaft in a smooth sleeve.

Recent trends toward the miniaturization of electrically driven tape recorders, phonographs, and similar appliances, have given rise to a demand for minniaturized electrical motors which are capable of operating efficiently to provide peak driving power while occupying a minimal space. It is also desirable that such miniaturized motor drive the recording tape past the recording head with no speed or audible pitch variation when employed as a driving means for an apparatus such as compact magnetic tape recording units. Therefore the miniature driving motor employed should ideally develop maximum output power with minimum friction while providing a smooth drive with minimum speed fluctuation and minimum axial movement of the rotor for long periods of time with the motor in any relative position with respect to gravity or inertia movement.

The present invention combines an improved AC motor structure with a novel RC drive oscilltaor control circuit to provide a self-starting, smooth running, motor drive unit which is not subject to the inefficient operation normally attendant with miniature motors.

A further object of this invention is to provide an improved miniaturized prime mover construction which includes a novel motor shaft support bearing structure and a reservoir of lubricant retained in a replenishing position in sizable amount by capillarity.

Another object of this invention is to provide an improved miniaturized motor construction which includes a novel self lubricating rotor shaft bearing support which approximates frictionless bearing support but without the noise and rumble nor the expense of a frictionless bearing such as a ball bearing.

A still further object of this invention is to provide an improved miniaturized electric motor and motor lubricating system capable of providing maximum smooth mechanical driving power for a compact electrical unit.

Figure 1:
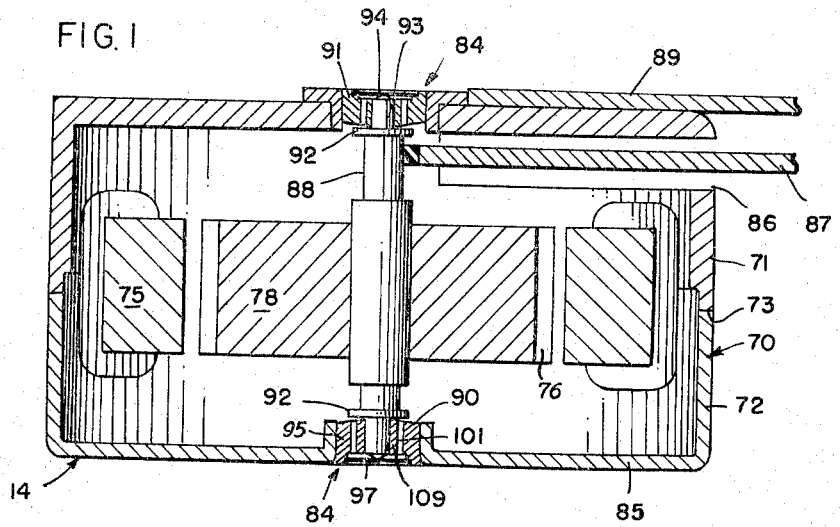
Figure 2:
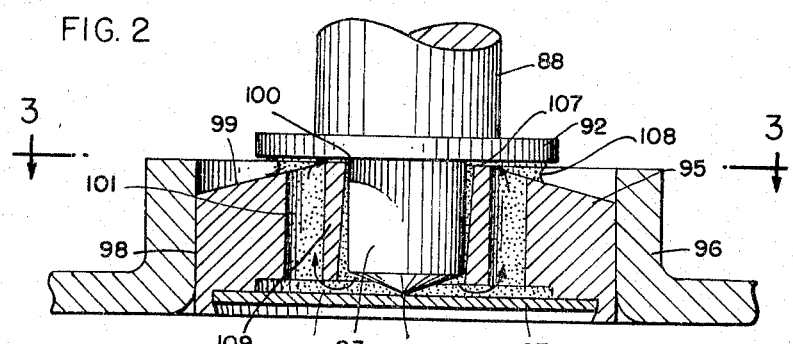
Figure 3:
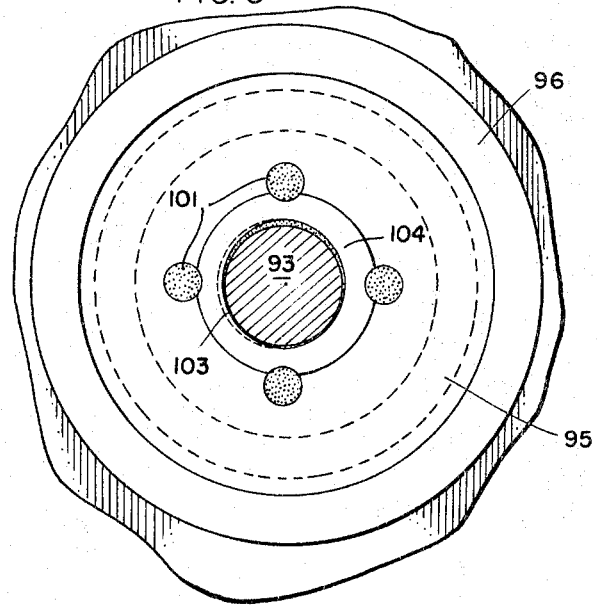
Figure 4:
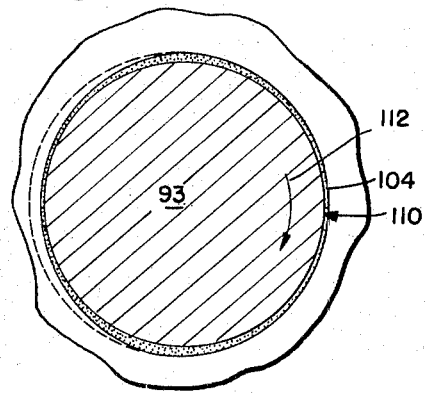

With the foregoing and other objects in view, the invention resides in the following specification and appended claims, certain embodiments and details of constructon of which are illustrated in the accompanying drawings in which:

FIG. 1 is a longitudinal sectional view of the electric motor of the present invention;

FIG. 2 s a partially sectioned view in side elevation of the rotor shaft bearing support of the electric motor of the present invention;

FIG. 3 is a sectioned plan view of the rotor shaft support of the electric motor of the present invention taken along lines 3—3 of FIG. 2; and FIG. 4 is a sectioned plan view of the rotor shaft mounting of FIG. 3.

The miniaturized electric motor and electric motor drive and control circuitry of the present invention may be advantageously employed as the driving unit for a compact tape recorder, for this driving unit is capable of providing the necessary frictionless, smooth, uninterrupted driving power for a magnetic tape which is required if clear reproduction of taped material is to be achieved with excellent fidelity. Although the electric motor of this invention is illustrated in conjunction with tape recorder components, it is to be understood that this invention may be employed as a driving component for other electrical units, and is in no way limited to tape recorders. Moreover, although ball bearings can be used in some applications, it is preferred in this application to eliminate their rumble with a sleeve bearing so lubricated that substantial frictionlessness is attained for long periods of operation.

Referring to the drawing, it will be noted that the motor 14 which is of an external diameter less than that of a U.S. half dollar silver coin, includes a stator 75 having a plurality of stator poles 76 which cooperate with the poles 77 of a laminated rotor 78 supported upon and disposed within a housing 70 of two half shells 71 and 72 secured edge to edge at a joint 73.

The bottoms of the shells 71 and 72 support identical bearing constructions including frictionless end thrusts and external oil seals for the shaft 88 of the rotor 78. Furthermore, the housing shell 71 is slotted radially through its side wall at 86 to permit the insertion of a rubber tired driven wheel 87 into friction contact with the shaft 88 of the rotor 78 intermediate the bearings but adjacent to one of them. Thus, the drive load is carried by both bearings. Motor 14 preferably is circular and may be mounted by any suitable means upon a support member 89 so as to maintain driven wheel 87 biased in to pressure contact with the rotor shaft 88.

The rotor shaft 88 is rotatably mounted in the end wall 85 of the housing 70 by shaft mountings 84 which constitute a lower bearing unit 90 and an upper bearing unit 91. The rotor 78 secured to the rotor shaft 88 is thereby maintained externally in closely spaced air gap relationship with the stator 75 which in turn is attached to the inner walls of the housing 85. The upper and lower bearing units of the shaft mounting 84 are substantially identical, and both will be described in connection with the single detailed bearing structure illustrated in FIG. 2.

With reference to FIG. 2, the rotor shaft 88 is provided with an integral bearing collar 92 spaced from the extremity of the rotor shaft. The outer extremities of the rotor shaft beyond the bearing collars 92 are formed to provide a cylindrical bearing 93 which is abruptly tapered terminally to form a bearing point 94 that provides a needle point type end-thrust bearing. Bearing 93 is mounted within a stationary bearing support structure or bushing 95 which is secured within the motor casing 85 by a press fit in an axial flange 96 or other suitable securing means on the motor housing.

The bushing 95 is quite large with respect to the diameter of the shaft for handling and seating purposes and includes a recess on the outside approximately .010" deep receiving a disk 97, side walls 98 and an inclined top wall 99 which tapers outwardly away from the collar 92 from a central circular aperture 100 of a width approximately .003". The aperture 100 forms the entrance to a bearing sleeve portion 109 which extends outwardly to a point adjacent the disk 97 and forms a receptacle for the bearing shaft 93 so that upon the insertion of the bearing shaft 93 into the aperture 100, the pointed bearing surface 94 rests upon the disk 97 with the bearing collar 92 spaced axially a limited slight distance away from the bearing 95 of approximately .003".

A plurality of spaced lubricant conducting passages 101 having an oil capillary size of .014" in diameter are formed in the bushing 95, and are arranged in spaced relationship about the periphery of the aperture 100. A recess in the bushing at 102 approximately .003" deep provides a lubricant conducting passage interconnecting the bearing area with the passages 101 and provide therewith a reservoir which holds the lubricant in place by capillary attraction. The dimensions given are by way of example and not by way of limitation.

In the construction shown, the space between the collar 92 and the top wall is one that gradually widens axially in a radial direction and can be defined by either element 92 or 99, or both having conical surfaces. In any event, the taper shown as 17° is not critical as long as there is sufficient narrowness radially beyond the passages 101 at all times to establish and maintain a capillary action support for the lubricant beyond the passages 101.

For operation of the shaft mount 84, the bearing shaft 93 and the shaft receiving bearing sleeve portion 109 are relatively arranged so that one may be given a controlled cant with respect to the other at both ends of the shaft. The canting is preferably confined to the bearing sleeve 109 in the stationary bearing unit 95 for the sake of ready uniformity and ease of assembly but canting may be provided at the bearing surfaces of shaft 93 relative to the bearing sleeve under shaft grinding tolerances. By so arranging the bearing shaft 93 and the bearing sleeve 95, the bearing shaft runs in a position close to the surface of the bearing sleeve but a little closer at two points than over the rest of mating areas. As illustrated at 103 in FIG. 3, a space is left between the bearing shaft and the walls of the bearing sleeve as illustrated at 104 and likewise at the other end of the bearing but on the opposite side 180° therefrom.

It has been found that if an endeavor is made to hold the two mating bearing surfaces perfectly concentric in production, a thing very difficult to attain consistently, there occurs either a large number of rejects or the frictional relationship between the rotor and the housing is quite variable under tolerances relaxed for commercial reasons even to the point of being undesirable particularly in a miniature motor. Apparently with the small clearances between the two bearing areas required for optimum performance desired with difficulty of holding concentricity is magnified in bearings built for a rated loading and battery power economy. The oil pressure axially along the bearing surfaces just ahead of the narrowest portion of the running fit clearance must be great enough to establish an oil film between the bearing parts in this area that will carry the bearing load without any lubricant starvation occurring at any point along the bearing that lowers the load carrying effectiveness due to undue closeness.

However, with a built-in canting of the bearing surfaces within the range of 20 to 50 millionths of an inch in a longer bearing of correspondingly increased bearing clearance not only is the oil pressurized adequately over sufficient cooperating bearing areas to assure effectively carrying the rated load, but the bearing is relieved of extra pressurizing burdens beyond that required. The wider clearances over other areas pass the oil with reduced pressurization and in doing so balance the pressurization with the load carrying requirements there being a variation of pressurization along the bearing. Moreover, this variation serves to move lubricant in an axial direction for circulation purposes. Not only this, but what rejects there may be can be salvaged quite easily by resetting the bearings thereby providing a less expensive motor commercially than a ball bearing motor and having important advantages for a large range of applications not possible with a ball bearing motor.

It will be appreciated that canting has occurred at random during assembly operations, but by controlling it in production to be present at all times in a predetermined relationship assures uniformity of product with predictable high performance. Controlled canting can be predesigned into the parts so that it is assuredly present only to the tolerance desired regardless of assembly techniques, but of the two ways when endeavoring to maintain other important production accuracies and tolerances in bearing sizes involved with miniaturized motors, the difficulties are greatly increased with building it in. Not only would the number of production rejects be materially greater because of the complexity of providing particular contours, irregularities or variations from cylindrical contricities required for all contours on a rotor including the rotor shaft right down to the needle point 94, but assembly would still have its share of rejects. Accordingly, it is preferred to produce parts with well tried basic contours and control the canting in assembly from the viewpoint of economy, production control and uniformity of performance of the final product with few but salvageable rejects.

Many other advantages occur with the canting described. Not only is total and balanced pressurization lubrication of the journals assured with adequate reserve, but the canting further steadies the rotor shaft 88 on a fixed axis in its rotation under within-tolerance dynamic balance variations and obviates dangers of sealing off the end of a bearing from a supply of lubricant at this point when the bearing elements are held against relative axial movement. Also with mild circulation of the lubricant by the action of the canted bearing areas any entrainment of air during depletion of lubricant supply is worked out upon replenishment.

Not only is each set of bearing areas closer at opposite ends on opposite sides, but the cant of the bearing at one end of the shaft is preferably kept opposite by 180° to the cant of the bearing at the other end of the shaft. Thus, every one half revolution a rotor having any minute dynamic unbaalnce is made to center itself. Also, with a rated speed of 9000 r.p.m. and a working speed slightly less, the tolerance of slight rotor unbalance is reasonable for standard measuring and balancing techniques particularly since the shaft is continuously in a centering contact with the bearing for co-axial operation on a fixed axis during the remaining portions of each revolution. Furthermore, testing for proper canting can be done with a slight run-in of the motor. If its coasting run-down is too short on power shut-off and the wattage is high, rejection is confirmed. In this connection it should be noted that quick checking can be accomplished and longevity assured because there is no end play in the rotor mounting. The needle points support 94 quickly establish what wear will occur and thereafter no further appreciable wear occurs in hundreds of hours operation. Any microscopic irregularities that might exist on either bearing surface rapidly grooves the other for its clearance alone without being free to shift axially and continue to wear away other portions of the opposing bearing area. Thus, wear is accomplished quickly and longevity of the bearing status is assured. This needle point effect also obviates the need for an extra conventional bearing polishing step required to reduce bearing wear where the bearing parts can move in a relative axial direction.

Moreover, adequate lubrication supply is greatly improved. Lubricant is supplied in quantity to fill all the spaces including the passages 101 and 102 and taper between faces 99 and 92 out as far or further than that indicated at 103 thereby storing a comparatively large supply of lubricant for long periods of operation between servicing. Then as the bearing shaft rotates the lubricant will be pumped in an unpredictable direction depending upon the relative location of the radial load and direction of rotation. Although there is a rotary directional movement also in all cases of the lubricant, the ultimate movement of the lubricant is axial out along the bearing surface and back through the passages 101. This direction of flow can change during a single use of a tape recorder if the radial load on the bearing is shifted as by relocation of the torque power take-off or if the recorder is reoriented to gravity or the direction of rotation is reversed. Thus, any entrained air is ultimately eliminated and the lubricant is retained against mechanical loss by a capillary storage system.

It wll be appreciated that weight of a rotor exerted in a radial direction is a radial load upon the bearing within the meaning of the term, but if it is assumed that the radial load is predominantly that exerted by the driven wheel 87 on the shaft as indicated by arrow 110 in FIG. 4 and the direction of rotation of the shaft is clockwise as indicated by arrow 112 the flow along the bearing will be axially away from the observer because the longitudinally viewed tapering clearance of the bearing faces will be less radially on the opposite side and the circumferential flow of lubricant will be forced by the narrow end of the taper proximate the observer to move axially towards the other end of the bearing as a progressive displacement relationship induced thereby. Shifting the radial load 180° will reverse the axial direction of the lubricant flow, or reversing the direction of rotation will reverse the axial direction of the lubricant flow. Reversing rotation and also shifting the load will leave the lubricant flowing in the same direction.

Also the canting of the sleeve bearing has the advantage of assuring a clearance at 107 to accommodate the lubricant circulation while at the same time assuring interlubrication of the two facing surfaces under axially directed weight loads, there being no work load thereon. It is preferred that the sleeve be canted rather than the shaft because the needle point bearing at 94 will run concentrically in the lubricant on a fixed axis rather than score a circle in the disc 97 and tolerances are such that the needle point bearings 94 contact their respective plates 97 enough to determine the desired clearance at 107 and support the rotor against appreciable axial movement influenced by gravity or magnetic flux conditions. In assembly, some strain can be exerted upon the needle bearings to assure establishment of a capillary spacing in the taper at 108 because once the bearing sleeve assembly is pressed into place with solid backing tool, there is some give to the plate 97 to accommodate strain at 94 without changing the capillary relationship established.

It will be appreciated that due to the smallness of the diameter at 108, the capillary action described will serve like a lubricant seal against any centrifugal forces that might be exerted at 9000 r.p.m.

The constant circulation of lubricating fluid through the bearing sleeve portion 109 and the passages 102, 101 and 107 causes the rotor shaft 88 to float practically free from friction within the shaft mounting unit 84, with only slight increase of the pressurizing load being present at points 94, 103 and 104. This load is largely put to work in circulating the lubricant and this pumping action insures that all moving and contacting parts of the upper and lower bearing mounts 90 and 91 are constantly wetted or bathed with an ample supply of lubricant to eliminate any momentary slow-ups in the movement of the tape across the record-play head of the tape recorder.

It will be readily apparent to those skilled in the art that the present invention provides an improved control circuit and motor construction for small electrical drive motors which is capable of operating to provide a smooth, efficient, powerful motor drive not normally attainable with flea power miniaturized units. The arrangement and types of components utilized within this invention may be subject to numerous modifications well within the purview of this inventor who intends only to be limited to a liberal interpretation of the specification and the appended claims.

What is claimed is:

1. In combination, a small electric motor having a housing, a rotor shaft, and a rotor shaft mounting therein, a bearing unit secured to said housing including a lubricant containing bearing sleeve having a circular side wall with a planar end wall defining an opening receiving said rotor shaft in journalled relation therein, a bearing collar on said shaft adjacent to said planar end wall, said circular bearing surface and planar end wall of said sleeve being canted relative to the bearing surface of said rotor shaft, whereby said bearing collar and rotor shaft are caused to run in closest relationship with said planar end wall and circular side wall on the same side of the rotor and said rotor shaft runs in closest relationship to said circular wall at the other end of the circular wall on the opposite side thereof to provide lubrication of said bearing sleeve and shaft at said closest relationship during rotation of said shaft, and end thrust bearing means interconnecting said bearing sleeve and shaft disposing said bearing collar and planar end wall in close proximity establishing a capillary action for lubricant therebetween and running seal means between said rotor and bearing sleeve confining said lubricant to said path of flow.

2. In combination a small electric motor having a housing, a rotor including a rotor shaft having convex contours on its end walls mounted within said housing, comprising an upper and lower bearing unit secured to said housing, each said upper and lower bearing unit including a lubricant containing bearing sleeve having an open end receiving said rotor shaft in journalled relation and including a circular side wall and a closed end wall, said closed end walls providing bearing surfaces point contact with said end walls of said rotor shaft, the circular bearing surface of said sleeve being canted relative to the bearing surface of said rotor shaft in that said rotor shaft runs in closer relationship over limited areas at opposite ends and opposite sides of said side wall of said bearing sleeve to provide a lubricant pumping action within said sleeve during rotation in conjunction with the remaining areas, and lubricant conducting means defining a path of flow axially around said side wall receiving lubricant from one end of a bearing unit and returning it to the other end thereof, and running seal means between said rotor and bearing sleeve engaged by and confining said lubricant to said path of flow, said running seal means comprising radially outwardly diverging walls rotatable with respect to each other with lubricant flow clearance between their inner edges and a proximity between said rotor and bearing sleeve radially beyond said lubricant conducting means establishing a capillary action for lubricant which terminates well within the outer limits of said diverging walls.

3. In combination, a small electric motor having a housing, a rotor within said housing including a rotor shaft, having means for journalling said rotor shaft comprising an integral bearing collar spaced from each end of said rotor shaft and extending laterally therefrom, upper and lower bearing shaft portions formed at the outer extremities of said rotor shaft beyond said bearing collars, the ends of said bearing shafts being convexly contoured to provide a terminal bearing point, upper and lower bearing units secured to said housing, said upper and lower bearing units including a lubricant containing bearing sleeve having a circular side wall with an open end adjacent to said collar for receiving said rotor bearing shaft and a closed end wall providing a contact bearing surface for the terminal bearing point of said bearing shaft to maintain said bearing collar in closely spaced relationship with said bearing sleeve, the control axis of said bearing sleeve having a controlled cant relative to the central axis of said bearing shaft for rotation of the shaft about a fixed axis in that said bearing shaft is closest to the side wall of said bearing sleeve at two diametrically and axially opposite points to provide a lubricant pumping action during rotation, and lubricant conducting passages formed in said bearing sleeve, said lubricant conducting passages communicating from adjacent the end wall of said bearing sleeve to a point adjacent and spaced from the open end thereof, said lubricant conducting passages transporting lubricant from the closed end of said bearing sleeve, beneath said bearing collar to the open end of said bearing sleeve during rotor shaft rotation.

4. The combination called for in claim 3 wherein each said bearing sleeve includes an inclined top wall at its open end, said inclined top wall tapering gradually outwardly from said bearing sleeve.

5. In combination, a small electric motor having a housing with concentric openings, a stator secured within said housing between said openings, a rotor shaft extending into said opening, and a rotor mounted upon said rotor shaft within said stator, upper and lower bearing units secured to said housing in said openings, each bearing unit including a shaft receiving bearing sleeve having an open end for receiving said rotor shaft, a circular side wall, a closed end wall and a lubricant conducting means interconnecting opposite ends of said bearing sleeve, said closed end wall providing an axial thrust bearing surface for contacting the end of said rotor shaft, the bearing surface of said sleeve having a controlled cant relative to the bearing surface of said rotor shaft to provide reduced clearance areas along the side wall of said bearing sleeve at diametrically opposite sides in axially spaced relationship for steadying the rotor shaft in a centering contact with the bearing sleeve for rotation on a fixed vertical axis and provide a lubricant pumping action during rotation in conjunction with the remaining areas, said lubricant conducting means communicating from adjacent the end wall of said bearing sleeve to a point adjacent and spaced from the open end thereof, and operating to transport lubricant from one end of said bearing sleeve to the other during rotor shaft rotation, each of said bearing units being canted in the same direction with respect to one another whereby the portion of one bearing unit side wall nearest the rotor shaft is disposed at a position substantially 180° from the portion of the other bearing unit side wall which is nearest the rotor shaft.

6. The combination as defined in claim 5, which further includes running seal means between said rotor shaft and the surface of the bearing plate at the open end thereof.

7. The combination as defined in claim 6 wherein, said housing is provided with end walls and a side wall with an access slot in one side thereof adjacent to one of said end walls, and driven wheel means extending through said slot in working contact with said shaft to place a radial load upon the shaft intermediate said bearing units and to drive said shaft along its fixed vertical axis of rotation.

References Cited

UNITED STATES PATENTS

| | | | |
|---|---|---|---|
| 1,992,818 | 2/1935 | Else | 308—134.1 X |
| 2,113,335 | 4/1938 | Wallgren | 308—134.1 X |
| 2,143,705 | 1/1939 | Lowe | 308—36.1 |
| 2,261,697 | 11/1941 | Paschen et al. | 308—133 |
| 2,416,141 | 2/1947 | Bartho | 308—134.1 X |
| 2,597,371 | 5/1952 | Perkins et al. | 308—9 |
| 2,854,298 | 9/1958 | Baumeister | 308—9 |
| 3,232,681 | 2/1966 | Mittmann et al. | 308—121 X |

FOREIGN PATENTS

| | | |
|---|---|---|
| 937,799 | 1/1956 | Germany. |
| 785,717 | 11/1957 | Great Britain. |

MARTIN P. SCHWADRON, *Primary Examiner.*

DAVID J. WILLIAMOWSKY, *Examiner.*

F. F. HESS, *Assistant Examiner.*